(12) United States Patent
Chiu

(10) Patent No.: US 9,013,659 B2
(45) Date of Patent: Apr. 21, 2015

(54) METHOD AND DEVICE FOR LIQUID CRYSTAL OPTICAL ALIGNMENT

(75) Inventor: Chung-Yi Chiu, Guandong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 353 days.

(21) Appl. No.: 13/576,396

(22) PCT Filed: Jun. 27, 2012

(86) PCT No.: PCT/CN2012/077598
§ 371 (c)(1),
(2), (4) Date: Jul. 31, 2012

(87) PCT Pub. No.: WO2013/189094
PCT Pub. Date: Dec. 27, 2013

(65) Prior Publication Data
US 2013/0342796 A1    Dec. 26, 2013

(30) Foreign Application Priority Data

Jun. 21, 2012    (CN) .......................... 2012 1 0207930

(51) Int. Cl.
*G02F 1/1337*    (2006.01)

(52) U.S. Cl.
CPC ............................... *G02F 1/133788* (2013.01)

(58) Field of Classification Search
None
See application file for complete search history.

(56) References Cited

U.S. PATENT DOCUMENTS

| 6,538,712 B1 * | 3/2003 | Winker et al. ................ 349/117 |
| 2004/0223112 A1 * | 11/2004 | Taniguchi et al. ............ 349/183 |
| 2007/0115412 A1 * | 5/2007 | Tsuchiya et al. .............. 349/117 |

* cited by examiner

*Primary Examiner* — Thanh-Nhan P Nguyen
(74) *Attorney, Agent, or Firm* — Andrew C. Cheng

(57) ABSTRACT

The present invention provides a method for liquid crystal alignment, which includes: providing a substrate, the substrate being disposed with a liquid crystal layer; using a first radiation beam and a second radiation beam to radiate the substrate, the first radiation beam being for performing alignment on liquid crystal layer and the second beam being for adjusting substrate temperature. The method and device for liquid crystal alignment of the present invention can rapidly adjust environment temperature during liquid crystal alignment and achieve optimization of reaction speed and uniformity through temperature control during polymerization. The present invention is simple in structure, easy to operate and low cost.

17 Claims, 2 Drawing Sheets

METHOD AND DEVICE FOR LIQUID CRYSTAL OPTICAL ALIGNMENT

BACKGROUND OF THE INVENTION

1. Field of the Invention

The present invention relates to the field of displaying techniques, and in particular to a method and device for liquid crystal optical alignment.

2. The Related Arts

At present, in displaying technique, specific UV is often used to perform optical alignment of liquid crystal layer to form pretilt angle. During alignment, the known technique usually uses constant temperature platform to control the environment temperature during liquid crystal alignment. However, because the temperature during the polymerization is controlled by the platform, the constant temperature platform of known technique is unable to rapidly adjust the temperature for different UV tube to match the process, which results in failing to achieve better working environment during alignment.

Thus, it is desired to have a method and device liquid crystal alignment so as to perform rapid adjustment of environment temperature during liquid crystal alignment.

SUMMARY OF THE INVENTION

The technical issue to be addressed by the present invention is to provide a method and device for liquid crystal optical alignment so as to perform rapid adjustment of environment temperature during liquid crystal alignment.

The present invention provides a method for liquid crystal alignment, which comprises: providing a substrate, the substrate being disposed with a liquid crystal layer; using a first radiation beam and a second radiation beam to radiate the substrate, the first radiation beam being for performing alignment on liquid crystal layer and the second beam being for adjusting substrate temperature.

According to a preferred embodiment of the present invention, the first radiation beam is UV.

According to a preferred embodiment of the present invention, wavelength of the second radiation beam is longer than wavelength of the first radiation beam by at least 100 nm.

According to a preferred embodiment of the present invention, the second radiation beam is infrared, visible light or a mixture of infrared and visible light.

The present invention provides a device for liquid crystal alignment, which comprises: a platform, for supporting a first substrate, the first substrate being disposed with a liquid crystal layer; at least a first radiation source, for radiating a first radiation beam for performing alignment on the liquid crystal layer; at least a second radiation source, for radiating a second radiation beam for adjusting substrate temperature; and a cover module, disposed between the platform and the first radiation source.

According to a preferred embodiment of the present invention, the first radiation source is a UV source, and the first radiation beam is UV.

According to a preferred embodiment of the present invention, wavelength of the second radiation beam is longer than wavelength Of the first radiation beam by at least 100 nm.

According to a preferred embodiment of the present invention, the second radiation beam is infrared, visible light or a mixture of infrared and visible light.

According to a preferred embodiment of the present invention, the at least a first radiation source and the at least a second radiation source are disposed above the platform in an alternating manner with gaps.

According to a preferred embodiment of the present invention, a cooling unit is disposed on the platform for cooling the platform.

According to a preferred embodiment of the present invention, the cooling unit is a condenser.

According to a preferred embodiment of the present invention, a second substrate is further disposed on the first substrate.

The present invention provides a device for liquid crystal alignment, which comprises: a platform, for supporting a substrate, the substrate being disposed with a liquid crystal layer; at least a first radiation source, for radiating a first radiation beam for performing alignment on the liquid crystal layer; at least a second radiation source, for radiating a second radiation beam for adjusting substrate temperature.

According to a preferred embodiment of the present invention, the first radiation source is a UV source, and the first radiation beam is UV.

According to a preferred embodiment of the present invention, wavelength of the second radiation beam is longer than wavelength of the first radiation beam by at least 100 nm.

According to a preferred embodiment of the present invention, the second radiation beam is infrared, visible light or a mixture of infrared and visible light.

According to a preferred embodiment of the present invention, the at least a first radiation source and the at least a second radiation source are disposed above the platform in an alternating manner with gaps.

According to a preferred embodiment of the present invention, a cooling unit is disposed on the platform for cooling the platform.

According to a preferred embodiment of the present invention, the cooling unit is a condenser.

The efficacy of the present invention is that to be distinguished from the state of the art. The method and device for liquid crystal alignment of the present invention can rapidly adjust environment temperature during liquid crystal alignment and achieve optimization of reaction speed and uniformity through temperature control during polymerization. The present invention is simple in structure, easy to operate and low cost.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following refers to drawings and embodiments of the present invention.

Figure 1:
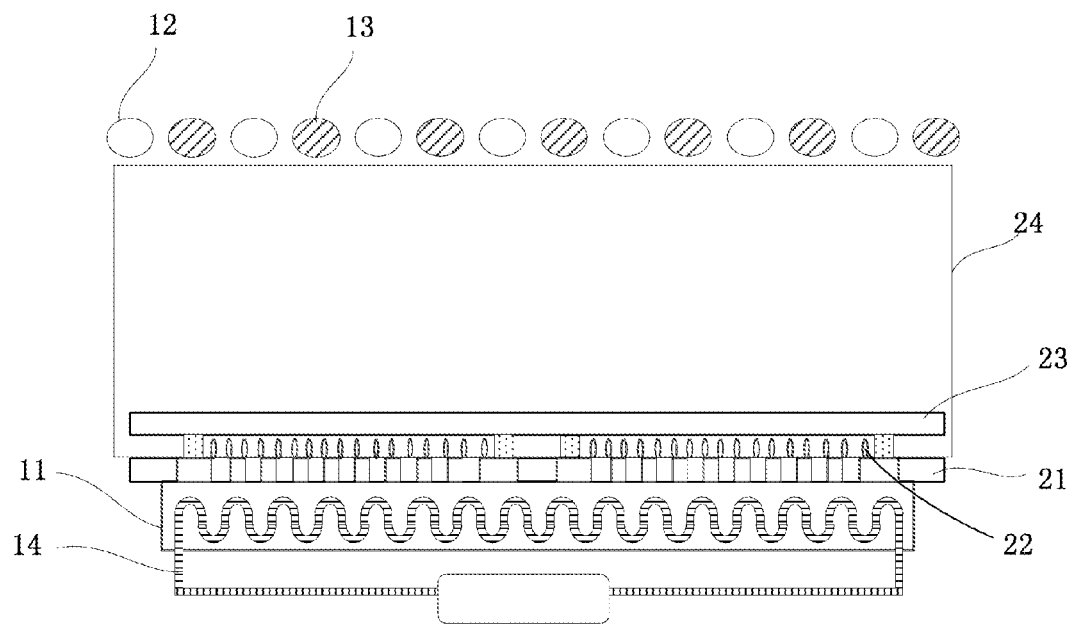
FIG. 1 is a schematic view showing the structure of the liquid crystal alignment device according to the present invention.

FIG. 1 is a schematic view showing the structure of the liquid crystal alignment device according to the present invention. As shown in FIG. 1, the device for liquid crystal alignment comprises: a platform 11, at least a first radiation source 12, at least a second radiation source 13 and a cooling unit 14.

In the instant embodiment, platform 11 is for supporting substrate 21. Substrate 21 is disposed with a liquid crystal layer 22. Substrate 21 is further disposed with a substrate 23. Substrates 21, 23 can be, for example, glass substrates of known technique. A cover module 24 is disposed between platform 11 and first radiation source 12.

First radiation source 12 is for radiating a first radiation beam for performing alignment on liquid crystal layer 22 so that liquid crystal will tilt a pretilt angle. In the instant embodiment, first radiation source 12 can be, for example, a UV source, and the first radiation beam is a UV light.

During alignment, to adjust environment temperature rapidly during aligning liquid crystal layer 22, the device for liquid crystal alignment of the present invention includes second radiation source 13. Second radiation source 13 is for radiating a second radiation beam for adjusting temperatures of substrates 21, 23. Through adjusting the temperatures of substrates 21, 23, the environment temperature of liquid crystal layer 22 can be rapidly adjusted. In the instant embodiment, to achieve rapid temperature adjustment, wavelength of the second radiation beam is longer than wavelength of the first radiation beam by at least 100 nm. For example, the second radiation beam can be infrared, visible light or a mixture of infrared and visible light.

To achieve rapid and uniform adjustment, in the instant embodiment, a plurality of first radiation sources 12 and a plurality of second radiation sources 13 are disposed above platform 11 in an alternating manner with gaps. Obviously, in other embodiments, the arrangement of a plurality of first radiation sources 12 and a plurality of second radiation sources 13 can be varied.

Platform 11 is further disposed with cooling unit 14. Cooling unit is for cooling platform 11 for further controlling temperatures of substrates 21, 23.

During liquid crystal alignment, the device for liquid crystal alignment of the present invention performs rapid environment temperature control of liquid crystal layer 22 through second radiation source 13 and cooling unit 14. Through temperature control, the liquid crystal achieves optimization of reaction speed and uniformity during polymerization and improves yield arte.

Figure 2:
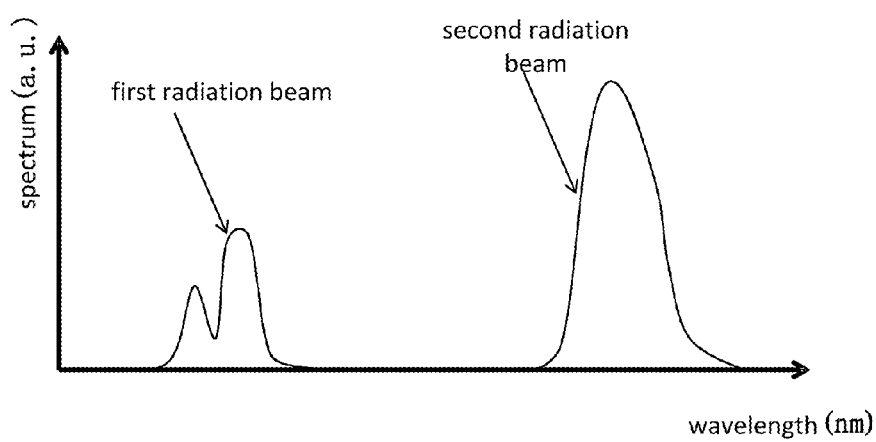
FIG. 2 is a schematic view showing the spectrum of the radiation beam used in the liquid crystal alignment device according to the present invention.

FIG. 2 is a schematic view showing the spectrum of the radiation beam used in the liquid crystal alignment device according to the present invention. As shown in FIG. 2, the wavelengths radiated by first radiation source 12 and second radiation source 13 are UV and infrared, respectively. First radiation source 12 radiates UV light to shine on substrates 21, 23 to supply energy required for polymer reaction in liquid crystal layer 22, and second radiation source 13 shines on substrates 21, 23 to supply energy for raising temperature of substrates 21, 23.

Figure 3:
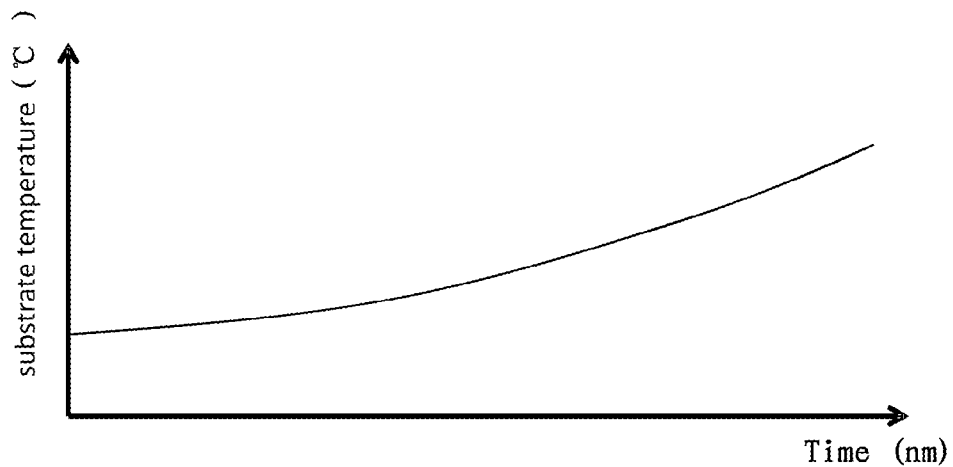
FIG. 3 is a schematic view showing the substrate temperature change of the liquid crystal alignment device according to the present invention.

FIG. 3 is a schematic view showing the substrate temperature change of the liquid crystal alignment device according to the present invention. As shown in FIG. 3, the infrared radiated from second radiation source 13 supplies energy for changing temperature of substrates 21, 23. Therefore, the environment temperature during liquid crystal alignment can change according to process time.

Figure 4:
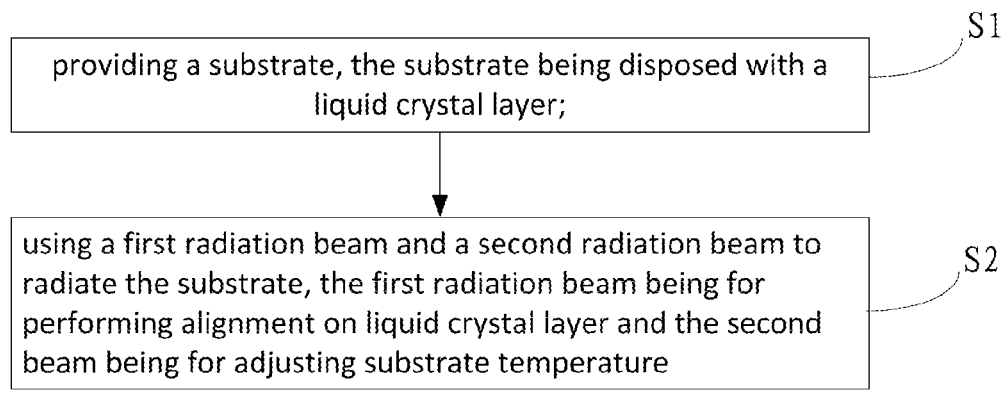
FIG. 4 is a flowchart showing the method of the liquid crystal alignment according to the present invention.

FIG. 4 is a flowchart showing the method of the liquid crystal alignment according to the present invention, which comprises:

Step S1: providing a substrate, the substrate being disposed with a liquid crystal layer.

Step S2: using a first radiation beam and a second radiation beam to radiate the substrate, the first radiation beam being for performing alignment on liquid crystal layer and the second beam being for adjusting substrate temperature.

In the instant embodiment, the first radiation beam is UV. Also, wavelength of the second radiation beam is longer than wavelength of the first radiation beam by at least 100 nm. For example, the second radiation beam is infrared, visible light or a mixture of infrared and visible light.

As such, the method and device for liquid crystal alignment of the present invention can rapidly adjust environment temperature during liquid crystal alignment and achieve optimization of reaction speed and uniformity through temperature control during polymerization. The present invention is simple in structure, easy to operate and low cost.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A method for liquid crystal alignment, which comprises:
providing a substrate, the substrate being disposed with a liquid crystal layer;
using at least one first radiation beam and at least one second radiation beam to radiate the substrate, the at least one first radiation beam being for performing alignment on liquid crystal layer and the at least one second beam being for adjusting substrate temperature; and
wherein the at least one first radiation source and the at least one second radiation source are alternately disposed.

2. The method for liquid crystal alignment as claimed in claim 1, characterized in that the first radiation beam is UV.

3. The method for liquid crystal alignment as claimed in claim 1, characterized in that wavelength of the second radiation beam is longer than wavelength of the first radiation beam by at least 100 nm.

4. The method for liquid crystal alignment as claimed in claim 3, characterized in that the second radiation beam is infrared, visible light or a mixture of infrared and visible light.

5. A device for liquid crystal alignment, which comprises:
a platform, for supporting a first substrate, the first substrate being disposed with a liquid crystal layer;
at least a first radiation source, for radiating a first radiation beam for performing alignment on the liquid crystal layer;
at least a second radiation source, for radiating a second radiation beam for adjusting substrate temperature; and
a cover module, disposed between the platform and the first radiation source,
wherein the at least a first radiation source and the at least a second radiation source are disposed above the platform in an alternating manner with gaps.

6. The device for liquid crystal alignment as claimed in claim 5, characterized in that the first radiation source is a UV source and the first radiation beam is UV.

7. The device for liquid crystal alignment as claimed in claim 5, characterized in that wavelength of the second radiation beam is longer than wavelength of the first radiation beam by at least 100 nm.

8. The device for liquid crystal alignment as claimed in claim 7, characterized in that the second radiation beam is infrared, visible light or a mixture of infrared and visible light.

9. The device for liquid crystal alignment as claimed in claim 5, characterized in that a cooling unit is disposed on the platform for cooling the platform.

10. The device for liquid crystal alignment as claimed in claim 5, characterized in that the cooling unit is a condenser.

11. The device for liquid crystal alignment as claimed in claim 5, characterized in that a second substrate is further disposed on the first substrate.

12. A device for liquid crystal alignment, which comprises:
a platform, for supporting a first substrate, the first substrate being disposed with a liquid crystal layer;
at least a first radiation source, for radiating a first radiation beam for performing alignment on the liquid crystal layer; and
at least a second radiation source, for radiating a second radiation beam for adjusting substrate temperature,
wherein the at least a first radiation source and the at least a second radiation source are disposed above the platform in an alternating manner with gaps.

13. The device for liquid crystal alignment as claimed in claim 12, characterized in that the first radiation source is a UV source and the first radiation beam is UV.

14. The device for liquid crystal alignment as claimed in claim 12, characterized in that wavelength of the second radiation beam is longer than wavelength of the first radiation beam by at least 100 nm.

15. The device for liquid crystal alignment as claimed in claim 14, characterized in that the second radiation beam is infrared, visible light or a mixture of infrared and visible light.

16. The device for liquid crystal alignment as claimed in claim 12, characterized in that a cooling unit is disposed on the platform for cooling the platform.

17. The device for liquid crystal alignment as claimed in claim 12, characterized in that the cooling unit is a condenser.

* * * * *